US010411925B2

(12) United States Patent
Vihriala (10) Patent No.: US 10,411,925 B2
(45) Date of Patent: Sep. 10, 2019

(54) APPARATUS AND METHOD FOR REDUCING EFFECTS OF PHASE NOISE (71) Applicant: Nokia Solutions and Networks Oy, Espoo (FI)

(72) Inventor: Jaakko Eino Ilmari Vihriala, Oulu (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 15/959,349

(22) Filed: Apr. 23, 2018

(65) Prior Publication Data
US 2018/0309604 A1  Oct. 25, 2018

(30) Foreign Application Priority Data
Apr. 24, 2017  (EP) .................... 17167795

(51) Int. Cl.
*H04L 27/00* (2006.01)
*H04B 17/00* (2015.01)
(Continued)

(52) U.S. Cl.
CPC ..... *H04L 27/0014* (2013.01); *H04B 17/0087* (2013.01); *H04B 17/345* (2015.01);
(Continued)

(58) Field of Classification Search
CPC ............. H04L 27/0014; H04L 27/2647; H04L 27/3433; H04L 27/3872; H04L 27/2338;
(Continued)

(56) References Cited

U.S. PATENT DOCUMENTS 6,151,368 A * 11/2000 Cochran .................. H04L 5/06
329/307
9,667,458 B1 * 5/2017 Frank .................. H04L 27/2679
(Continued)

FOREIGN PATENT DOCUMENTS

JP 2013-225777 A 10/2013
WO WO-2016/196626 A1 12/2016

OTHER PUBLICATIONS

Thomas, Timothy A. et al., "Blind Phase Noise Mitigation for a 72 GHz Millimeter Wave System," IEEE ICC 2015 SAC—Millimeter-wave Communications, 2015, 6 pgs.
"On PCRS Design for NR," Nokia, Alcatel-Lucent Shanghai Bell, Verizon Wireless, 3GPP TSG-RAN WG1 #86-Bis, R1-1610276, Oct. 10-14, 2016, Lisbon, Portugal, 8 pgs.
(Continued)

*Primary Examiner* — Vineeta S Panwalkar
(74) *Attorney, Agent, or Firm* — Harrington & Smith (57) ABSTRACT The proposed solution relates to a method and an apparatus in a communication system. The solution includes receiving as an input a frame including of a set of data symbols and reference symbols, each data symbol forming a rectangular symbol constellation of samples, derotating the first symbol of the set on the basis of the reference symbols, and setting phase rotating angle of the first symbol as zero. The solution further includes for each following successive symbol in the set of symbols: performing equalization; reducing the number of samples in the constellation by selecting samples in two or more corners of the constellation by utilizing two or more threshold values; estimating the phase rotating angle of the symbol from the reduced number of samples and derotating the symbol on the basis of the determined phase rotating angle.

21 Claims, 7 Drawing Sheets (51) Int. Cl.
| | |
|---|---|
| *H04B 17/345* | (2015.01) |
| *H04L 25/03* | (2006.01) |
| *H04L 27/233* | (2006.01) |
| *H04L 27/26* | (2006.01) |
| *H04L 27/34* | (2006.01) |
| *H04L 27/38* | (2006.01) |

(52) U.S. Cl.
CPC .... *H04L 25/03305* (2013.01); *H04L 27/2338* (2013.01); *H04L 27/2647* (2013.01); *H04L 27/3433* (2013.01); *H04L 27/3872* (2013.01); *H04L 2027/003* (2013.01); *H04L 2027/0038* (2013.01); *H04L 2027/0067* (2013.01)

(58) Field of Classification Search
CPC ....... H04L 25/03305; H04L 2027/0038; H04L 2027/003; H04L 2027/0067; H04B 17/0087; H04B 17/345
See application file for complete search history.

(56) References Cited

U.S. PATENT DOCUMENTS

2013/0281038 A1    10/2013  Ezaki ..................... 455/226.1
2015/0311986 A1    10/2015  Thomas et al.

OTHER PUBLICATIONS

Vihriala, Jaakko et al., "Frame Structure Design for Future Millimetre Wave Mobile Radio Access," 2016 IEEE Globecom Workshops XP033063095, Dec. 4, 2016, 6 pgs.

* cited by examiner

APPARATUS AND METHOD FOR REDUCING EFFECTS OF PHASE NOISE

TECHNICAL FIELD

The exemplary and non-limiting embodiments of the invention relate generally to communications.

BACKGROUND

In communication, especially in wireless communication, there are many factors that have effects on the quality of the communication. Some of these factors are due to the communication channel between the transmitter and the receiver, some are due to the non-idealities occurring in the transmitter and the receiver, especially in the radio frequency and analogue parts of the apparatuses.

In wireless communication, used frequencies tend to be high and modulation methods complex. These factors present challenges in the design of communication apparatuses as the aim is to maximize the capacity of the available communication channel and the quality.

Some of the problems related to wireless communication are common phase error and carrier frequency offset. These problems are inherent especially when carrier frequencies are high.

BRIEF DESCRIPTION

According to an aspect of the present invention, there is provided an apparatus in a communication system, comprising: means for receiving as an input a data structure comprising of a set of data symbols and reference symbols, each data symbol forming a rectangular symbol constellation of samples, means for derotating the first symbol of the set on the basis of the reference symbols, means for setting phase rotating angle of the first symbol as zero; and for each following successive symbol in the set of symbols: means for performing equalization, means for reducing the number of samples in the constellation by selecting samples in two or more corners of the constellation by utilising two or more threshold values, means for estimating the phase rotating angle of the symbol from the reduced number of samples and means for derotating the symbol on the basis of the determined phase rotating angle.

According to an aspect of the present invention, there is provided a method in a receiver of a communication system, comprising: receiving as an input a data structure comprising of a set of data symbols and reference symbols, each data symbol forming a rectangular symbol constellation of samples, derotating the first symbol of the set on the basis of the reference symbols, assuming phase rotating angle of the first symbol as zero, for each following successive data symbol in the set of symbols: perform equalization, reduce the number of samples in the constellation by selecting samples in two or more corners of the constellation by utilising two or more threshold values, estimate the phase rotating angle of the symbol from the reduced number of samples, and derotate the symbol on the basis of the determined phase rotating angle.

One or more examples of implementations are set forth in more detail in the accompanying drawings and the description below. Other features will be apparent from the description and drawings, and from the claims.

BRIEF DESCRIPTION OF THE DRAWINGS

In the following the invention will be described in greater detail by means of preferred embodiments with reference to the attached [accompanying] drawings, in which.

DETAILED DESCRIPTION OF SOME EMBODIMENTS

Embodiments are applicable to any base station, user equipment (UE), user terminal (UT), corresponding component, and/or to any communication system or any combination of different communication systems that support required functionalities.

The protocols used, the specifications of communication systems, servers and user terminals, especially in wireless communication, develop rapidly. Such development may require extra changes to an embodiment. Therefore, all words and expressions should be interpreted broadly and they are intended to illustrate, not to restrict, embodiments.

Many different radio protocols to be used in communications systems exist. Some examples of different communication systems are the universal mobile telecommunications system (UMTS) radio access network (UTRAN or E-UTRAN), long term evolution (LTE, known also as E-UTRA), long term evolution advanced (LTE-A), 5th generation mobile networks, Wireless Local Area Network (WLAN) based on IEEE 802.11 standard, worldwide interoperability for microwave access (WiMAX), Bluetooth®, personal communications services (PCS) and systems using ultra-wideband (UWB) technology. IEEE refers to the Institute of Electrical and Electronics Engineers.

In the following, different embodiments will be described using, as an example of an access architecture illustrated in FIG. 1 to which the embodiments may be applied. Here LTE-A terminology is used without limiting the invention to LTE-A, however.

Figure 1:
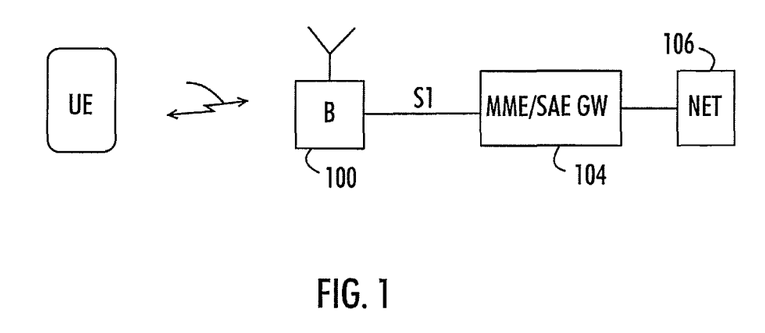
FIG. 1 illustrates an example of a communication system.

FIG. 1 is a simplified system architecture only showing some elements and functional entities, all being logical units whose implementation may differ from what is shown. It is apparent to a person skilled in the art that the system may also comprise other functions and structures that are not illustrated, for example connections to the core network/system.

The exemplary system illustrated in FIG. 1 comprises a user terminal 100 (only one illustrated in FIG. 1) and a network node 102 controlling one or more cells in a radio access system, and a mobility management entity/serving gateway 104.

The mobility management entity (MME) represents a mobility anchor entity in a core network that is involved in the bearer activation/deactivation processes, for example. The mobility management entity is configured to support carrier aggregation. The serving gateway (S-GW) routes and forwards user data packets further.

The user terminal (user equipment, UE) 100 illustrates one type of an apparatus to which resources on the air interface are allocated and assigned, and thus any feature described herein with user apparatus (user equipment) may be implemented with a corresponding apparatus. The user terminal 100 refers to a portable computing device that includes wireless mobile communication devices operating with or without a subscriber identification module (SIM), including, but not limited to, the following types of devices: mobile phone, smart-phone, personal digital assistant (PDA), handset, laptop computer, e-reading device, and tablet. The user terminal 102 may be configured to support also carrier aggregation.

In the example of FIG. 1, the network nodes 102 depicts an apparatus controlling one or more cells via which access is provided to the network the user terminals and the network nodes are connected to. In an LTE-A system, such a network node is an evolved node B (eNB). The evolved node B 102, or any corresponding network apparatus controlling one or more cells, is a computing device configured to control the radio resources, and connected to the evolved packet core network, thereby providing the user terminal 100 a connection to the communication system. Typically, but not necessarily, the evolved node B comprises all radio-related functionalities of the communication whereby the evolved node B, for example, schedules transmissions by assigning certain uplink resources for the user terminal and informing the user terminal about transmission formats to be used. The node 102 may be configured to perform one or more of evolved node B functionalities.

The evolved node B also provides the cells but the exemplary embodiments may be implemented with a solution having a separate controlling apparatus, and separate cell providing apparatuses controlled by a controlling apparatus. Further, the cells may be macro cells, and/or small cells.

The eNBs may be configured to communicate with mobility management entity/serving gateway 104 using S1-MME/S1-U interface, for example. In addition, eNBs may communicate with each other using X2 interface.

Figure 2:
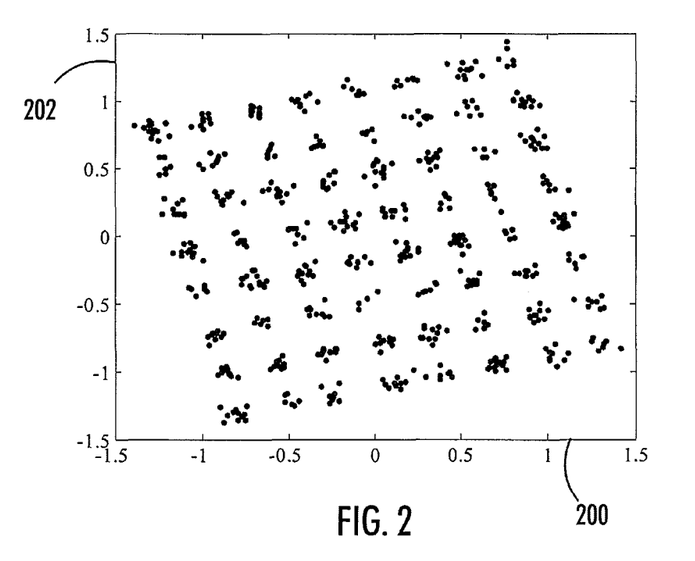
FIG. 2 illustrates an example of a data symbol received by a receiver.

As mentioned, carrier frequency offset (CFO) and common phase error (CPE) due to phase noise are inherent in radio communication systems, especially when the carrier frequency is high. In many communication systems the communication utilises data structures such as frames, subframes or slots which comprise of a set of data symbols and where each data symbol forms a symbol constellation of samples. The constellation may be of a rectangular form, square or non-square, for example. FIG. 2 illustrates an example of a data symbol received by a receiver, where the CPE/CFO has rotated the received constellation. When transmitted, the sides of the rectangular symbol constellation were aligned to the horizontal 200 and vertical 202 axis. However, due to CPE/CFO, the whole constellation has rotated the amount of a phase rotating angle $\alpha$. In the receiver, it is the purpose to determine the phase rotating angle $\alpha$ and derotate the constellation on the basis of the determined angle $\alpha$ before decoding the symbol.

It is known to utilise a demodulation reference signal (DMRS), which may be embedded in the data symbols, in the receiver to estimate the phase rotation of the received constellation. There are also several blind methods for CPE estimation. The disadvantages of these solutions are high computational complexity and/or poor performance with low signal to noise ratios. Another disadvantage is that large phase rotations cannot be detected.

In an embodiment, the DMRS symbol(s) are located in the beginning of the frame or subframe and data symbols follow the DMRS symbols. This implementation is denoted as front-loaded DMRS. In an embodiment, the property of phase noise, denoted as "random walk", where the consecutive samples of the PN process are correlated, and the change of the phase between consecutive OFDM symbols is relatively small, is utilized.

Figure 3A:
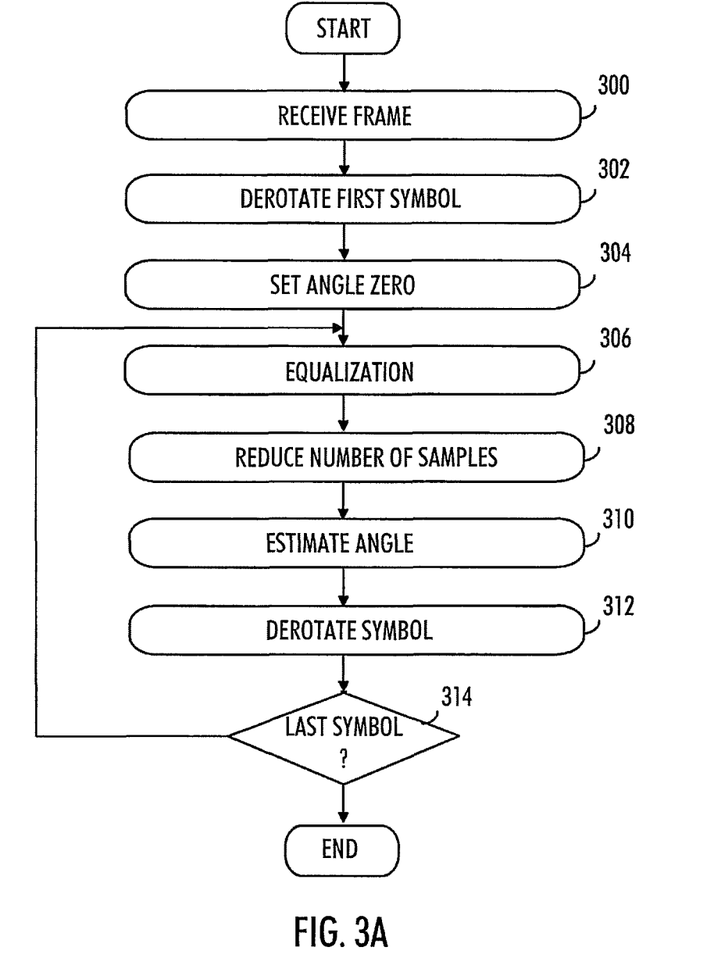
FIGS. 3A and 3B, are flowcharts illustrating embodiments of the invention.

FIG. 3A is a flowchart illustrating an embodiment of the invention in a receiver of a communication system. The figure illustrates an example of the operation of an apparatus such as an eNB or user terminal controlling. The steps of the flowchart may also be in different order than illustrated in FIG. 3A. In following the term frame is used but embodiments apply likewise to subframes or other data structures as one skilled in the art is aware.

In step 300, the apparatus is configured to receive as an input a frame comprising of a set of data symbols and reference symbols. Each data symbol forms a rectangular symbol constellation of samples, as depicted in FIG. 2. The reference symbols may be DMRS symbol(s).

In step 302, the apparatus is configured to derotate the first data symbol of the set on the basis of the reference symbols.

In step 304, the apparatus is configured to assume or set phase rotating angle of the first symbol as zero. By derotating the first data symbol on the basis of the reference symbols the effect of phase noise may be eliminated. Generally, in the beginning of the frame the effect of phase noise is the smallest.

For each following successive symbol in the set of symbols, following steps may be taken:

In step 306, the apparatus is configured to perform equalization using known methods.

In step 308, the apparatus is configured to reduce the number of samples in the constellation by selecting samples in two or more corners of the constellation by utilising two or more threshold values. In an embodiment, the thresholds depend on the modulation method used in the transmission of the symbols.

In step 310, the apparatus is configured to estimate the phase rotating angle $\alpha$ of the symbol from the reduced number of samples.

In step 312, the apparatus is configured to derotate the symbol on the basis of the determined phase rotating angle $\alpha$. Thus, the effect of phase noise on the symbol may be eliminated.

If there are more symbols 314, the steps 306 to 312 are repeated for the next symbol.

Figure 4A:
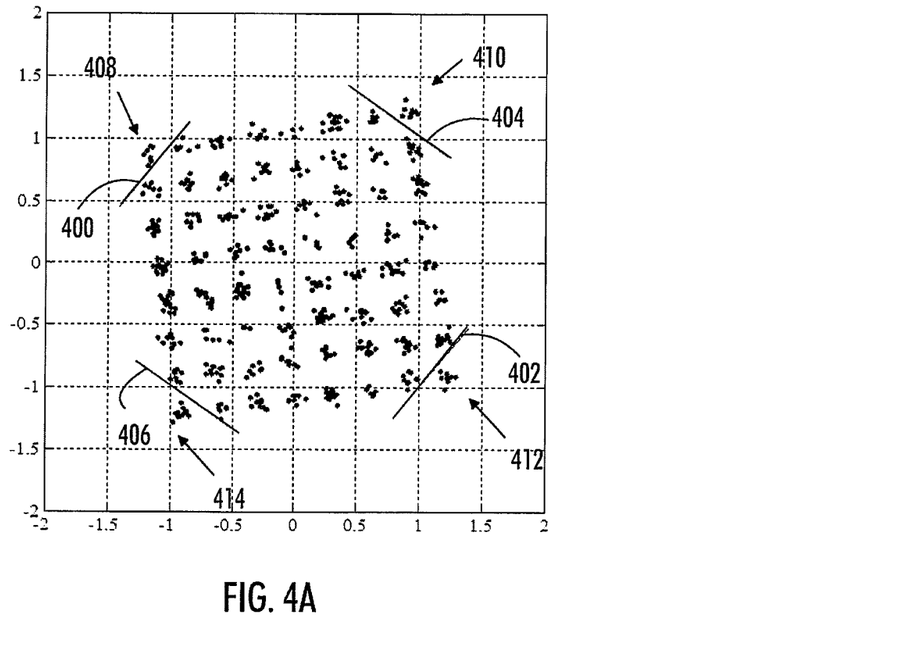
FIGS. 4A and 4B illustrate some embodiments of determining phase rotation angle of a symbol.
Figure 4B:
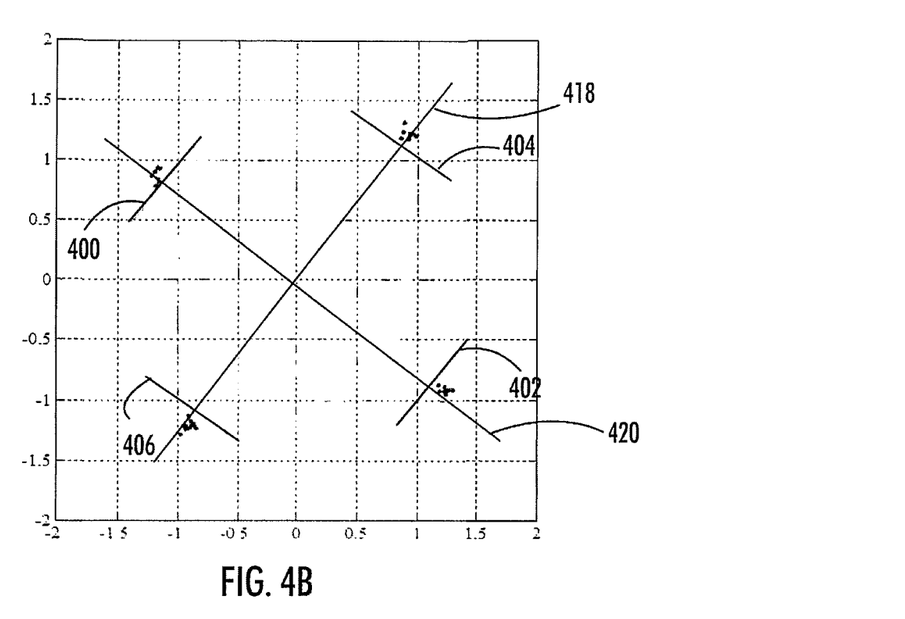

FIGS. 4A and 4B illustrate steps 308, and 310 of this embodiment. The rectangular shape of the constellation may be utilised here. FIG. 4A illustrates the received symbol constellation, which has been rotated due to phase noise or CFO. In this example, four thresholds 400, 402, 404, 406 are utilised to limit the number of samples in the constellation.

Let us assume that n:th symbol of the received frame is being processed. Thus, the symbol has a phase rotating angle $\alpha_n$. The four thresholds may be of the form $x=k_{th}*y+a_{th}$, where $k_{th}$ and $a_{th}$ are constants depending on the modulation method used in the transmission of the symbols and the phase rotating angle $\alpha_{n-1}$ of the previous symbol. The size and shape of the symbol constellation depend on the modulation method used, as is known in the art. As mentioned, in general, the change of the phase between consecutive symbols is relatively small. By utilizing information on the phase rotating angle of the previous symbol more accurate results may be obtained. The angle of the first symbol may be assumed to be zero.

Utilising the four thresholds, it is possible to select samples at the each corner of the symbol constellation. Thus, after utilising thresholds, four sample groups are obtained, the sample groups forming two sample group pairs where the sample groups of a sample group pair are on the opposite sides of the constellation. In the example of FIGS. 4A and 4B, the thresholds are at the upper left 408, upper right 410, lower left 414 and lower right 412 corners of the symbol constellation. The first sample group pair comprises the samples at the upper left and lower right corners and the second sample group pair comprises samples at the upper right and lower left corners.

In an embodiment, the phase rotating angle of the symbol may be estimated as follows.

A first line 420 passing through a sample group pair, for example the samples at the upper left and lower right corners of the constellation, is determined and slope k1 of the line is determined.

Likewise, a second line 418 passing through the other sample group pair, i.e. the samples at the upper right and lower left corners of the constellation is determined and the slope k2 of the line is determined.

Next, final slope k3 may be determined as k3=½*(k1−1/k2).

Finally, the phase rotating angle $\alpha_n$ of the examined symbol is obtained from $$\alpha_n = \mathrm{atan}(k3) - \pi/4.$$

Now the symbol may be derotated on the basis of the determined phase rotating angle $\alpha_n$ and the effect of phase noise or CPE/CFO on the symbol may be eliminated.

Figure 3B:
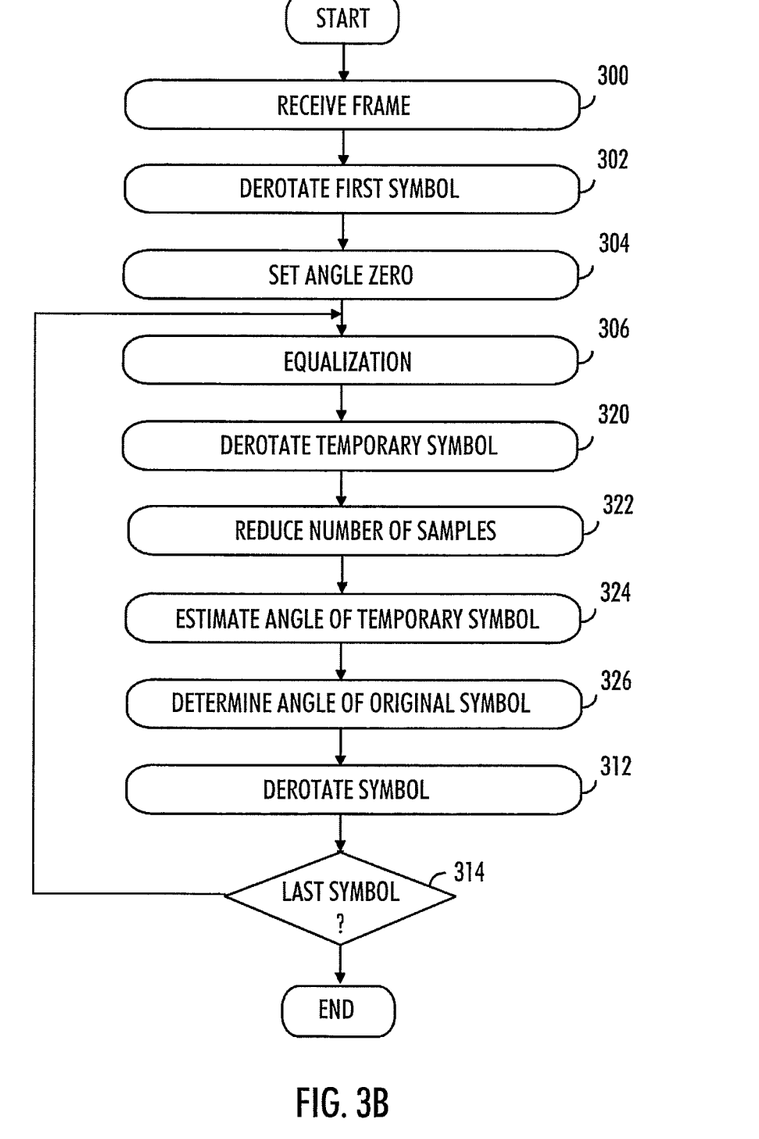

FIG. 3B is a flowchart illustrating another embodiment of the invention in a receiver of a communication system. The Figure illustrates an example of the operation of an apparatus such as an eNB or user terminal controlling. The steps of the flowchart may also be in different order than illustrated in FIG. 3B.

Part of the steps of FIG. 3B are similar to the flow chart of FIG. 3A. The similar steps have the same reference number. The first steps 300, 302, 304 and 306 are the same. In this example embodiment, a temporary copy of the symbol to be derotated is utilized as discussed below.

In step 320, the apparatus is configured to after equalization derotate a temporary copy of the symbol using the phase rotating angle $\alpha_{n-1}$ of the previous symbol. Thus, the symbol constellation is derotated on the basis of the phase rotating angle of the previous symbol. In this way, the rotating angle of the symbol may be reduced.

In step 322, the apparatus is configured to reduce the number of samples in the derotated constellation of the temporary copy of the symbol. This step is discussed in detail below.

In step 324, the apparatus is configured to estimate the phase rotating angle $\alpha_{nT}$ of the temporary symbol from the reduced number of samples. This step is discussed in detail below.

In step 326, the apparatus is configured to determine the phase rotating angle $\alpha_n$ of the original symbol as a sum of the estimated phase rotating angle $\alpha_{nT}$ and the phase rotating angle $\alpha_{n-1}$ of the previous symbol.

As in FIG. 3A, in step 312, the apparatus is configured to derotate the symbol on the basis of the determined phase rotating angle $\alpha$. Thus, the effect of phase noise on the symbol may be eliminated. Further, if there are more symbols 314, the steps 306 to 312 are repeated for the next symbol.

Figure 5A:
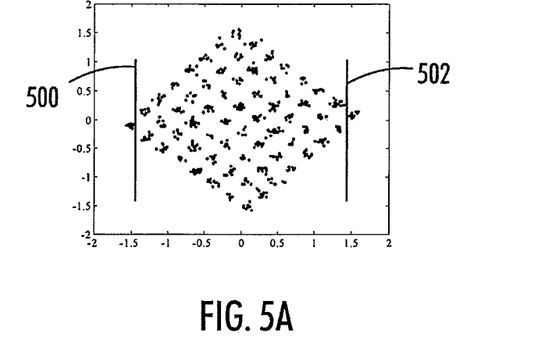
FIGS. 5A, 5B, SC, 6A and 6B illustrate some further embodiments of determining phase rotation angle of a symbol.
Figure 5B:
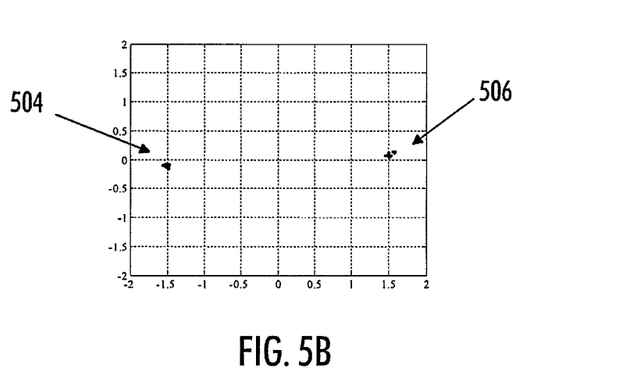
Figure 5C:
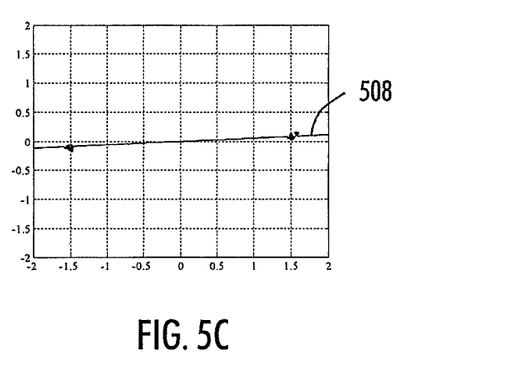

FIGS. 5A, 5B and 5C illustrate a first example embodiment of realising steps 324 and 326. In this example, reducing the number of samples in the constellation comprises first rotating the temporary copy of the symbol constellation a predetermined number of degrees. In this case, where the constellation is rectangular, the amount of degrees may be approximately 45, for example. In general, the rotation angle may depend on the shape of the constellation. In this case, the rotation leads to the constellation of FIG. 5A. Next, the samples with the smallest real parts of the symbol constellation are determined by applying a lower threshold 500 and selecting samples that are smaller 504 than the threshold. Likewise the samples with the largest real parts of the symbol constellation are determined by applying a higher threshold 502 and selecting samples that are greater than the threshold. In an embodiment, the lower and the higher thresholds 500, 502 depend on the modulation method used in the transmission of the symbols.

Estimating the phase rotating angle of the temporary copy of the symbol comprises first determining a line 508 passing through the smallest and largest real samples 504, 506. In an embodiment, linear regression may be used to fit these samples to a line $y=k_r*x$. As an example of linear regression, coefficient or slope $k_r$ of the line can be calculated as $$k_r = \frac{N\sum_{i=1}^{N} x_i y_i - \left(\sum_{i=1}^{N} x_i\right)\left(\sum_{i=1}^{N} y_i\right)}{N\sum_{i=1}^{N} x_i^2 - \left(\sum_{i=1}^{N} x_i\right)^2}$$

where N is the number of samples, $x_i$ and $y_i$ are the real and imaginary parts of each sample. The presented formula is one example of possible calculation methods. Also other formulas may be used as in clear to one skilled in the art. The rotation angle can then be estimated as $$\alpha_{nT} = \mathrm{atan}(k_r)$$

The phase rotating angle $\alpha_n$ of the original symbol may be calculated as a sum of the estimated phase rotating angle $\alpha_{nT}$ and the phase rotating angle $\alpha_{n-1}$ of the previous symbol:

$$\alpha_n = \alpha_{nT} + \alpha_{n-1}.$$

Above, real sample values were utilised. Imaginary samples may be used as well. In that case, reducing the number of samples in the constellation comprises first selecting samples with the smallest imaginary parts of the symbol constellation by applying a lower threshold and selecting samples that are smaller than the threshold and selecting samples with the largest imaginary parts of the symbol constellation by applying a higher threshold and selecting samples that are greater than the threshold. Then rotating the constellation having the smallest and largest imaginary samples 90 degrees. In a similar manner as above estimating the phase rotating angle of a symbol comprises determining a line passing through the smallest and largest imaginary samples, determining the slope $k_i$ of the line and calculating the phase rotating angle $\alpha_{nT}$ on the basis of the slope. In above equation for $\alpha_{nT}$ slope $k_r$ of real sample line may be replaced with slope $k_i$ of imaginary sample line.

In an embodiment, both real and imaginary samples may be used. In such a case the method comprises determining a value for a first slope $k_r$ on the basis of the smallest and largest real samples and a value for a second slope $k_i$ on the basis of the smallest and largest imaginary samples, taking an average of the first and second slope and calculating the phase rotating angle on the basis of the average.

Figure 6A:
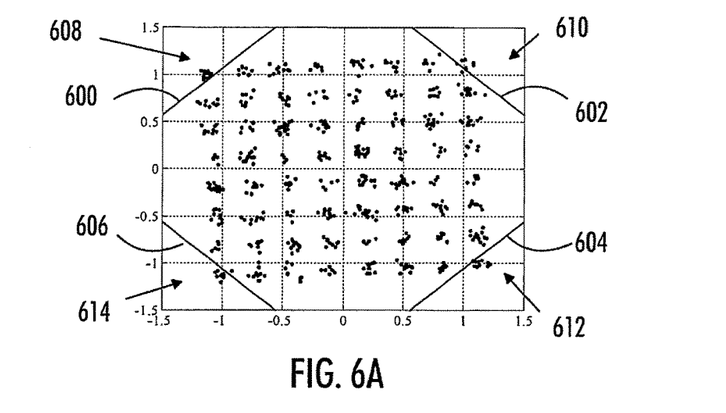
Figure 6B:
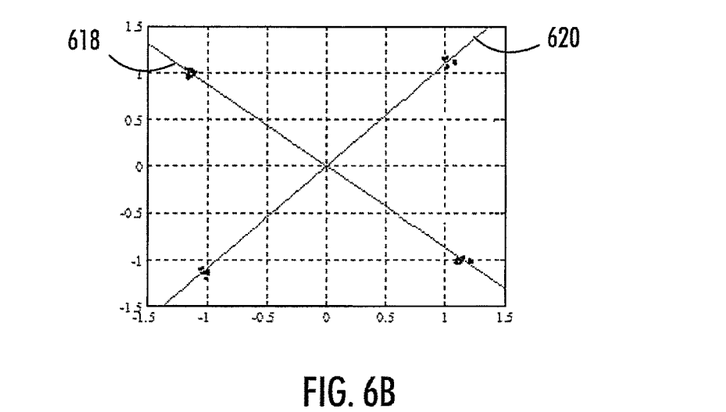

FIGS. 6A and 6B and illustrate a second example embodiment of realising steps 324 and 326. In this example, reduce the number of samples in the constellation comprises utilising four thresholds 600, 602, 604, 606 to limit the number of samples in the constellation.

Like above in connection with FIGS. 4A and 4B the four thresholds may be of the form x=$k_{th}$*y+$a_{th}$, where $k_{th}$ and $a_{th}$ are in this case constants depending on the modulation method used in the transmission of the symbols.

Utilising the four thresholds, it is possible to select samples at each corner of the symbol constellation. Thus, after utilising thresholds, four sample groups are obtained, the sample groups forming two sample group pairs where the sample groups of a sample group pair are on the opposite sides of the constellation. In the example of FIGS. 6A and 6B, the thresholds are at the upper left 608, upper right 610, lower left 614 and lower right 612 corners of the symbol constellation. The first sample group pair comprises the samples at the upper left and lower right corners and the second sample group pair comprises samples at the upper right and lower left corners.

In an embodiment, the phase rotating angle of the symbol may be estimated as follows.

A first line 618 passing through a sample group pair, for example the samples at the upper left and lower right corners of the constellation is determined and slope k4 of the line is determined.

Likewise, a second line 620 passing through the other sample group pair, i.e. the samples at the upper right and lower left corners of the constellation is determined and the slope k5 of the line is determined.

Next, final slope k6 may be determined as k6=½*(k4−1/k5).

Finally, the phase rotating angle $\alpha_n$ of the examined symbol is obtained from $\alpha_n$=atan(k6)−π/4.

Now the symbol may be derotated on the basis of the determined phase rotating angle $\alpha_n$ and the effect of phase noise or CPE/CFO on the symbol may be eliminated.

In an embodiment, for example when the processing capability of the apparatus performing the method is limited, only k4 or k5 may be calculated to obtain the final slope with lesser amount of processing.

In an embodiment, when the receiver receiving the frames to be processed utilises multiple antennas or antenna groups and thus the received signal may comprise several layers, the processing may be performed separately for each layer.

In an embodiment, when utilising the thresholds the number of samples is determined after reducing the number of samples utilising two or more threshold values. If the number of remaining samples is smaller or greater under than given limits, the threshold values may be adjusted and the number of samples in the constellation may be redone.

In an embodiment, where two slopes are determined, such as the examples with k1, k2 and k4, k5, an additional constraint may be used in determining the slopes. For example, it may be set that the lines used in the determination of the final slope must ne perpendicular. Thus, in the above examples k1=−1/k2 and k4=−1/k5. In the above examples, the final slope may be determined as $\alpha_n$=atan (k1)−π/4, and $\alpha_n$=atan(k4)−π/4.

Further, referring to FIGS. 4B and 6B, the samples in upper left and lower right corners may be rotated 90 degrees and then calculate the slope by performing linear regression to all samples.

Figure 7:
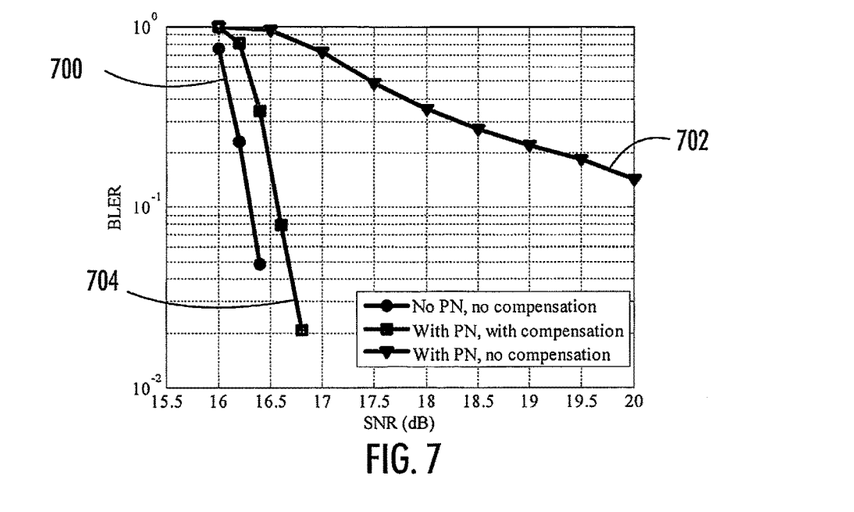
FIG. 7 illustrates an example of the performance of the described solution.

FIG. 7 illustrates an example of the performance of the described solution. FIG. 7 illustrates block error rate (BLER) or a received signal as a function of signal to noise ratio SNR. The figure shows BLER 700 in a ideal situation where there is no phase noise. The graph 702 shows performance when no phase noise compensation has been done and graph 704 illustrates the performance applying the proposed solution. As can be seen the proposed solution provides an excellent performance.

The proposed solution has many advantages. As illustrated in FIG. 7 the performance is good. Further, due to the loop structure the proposed solution works well also in cases where the received symbols have large phase rotation angles. The solution has low complexity compared to prior art methods since it does not require any iterations.

In an embodiment, the phase rotation information provided by the solution may be utilised in the receiver prior FFT to reduce inter-carrier interference (ICI) by providing the phase rotation information as a feedback to interference cancellation.

In an embodiment, the proposed solution may be combined with other methods such as phase noise tracking reference signal (PTRS). For example, the final rotation angle estimate may be a combination of the proposed method and an angle estimate from a PTRS based method. It may be noted that the use of PTRS involves overhead since the PTRS subcarriers used by one user cannot be used for data by the same or other users. With the proposed solution the PTRS overhead may be reduced by reducing the number of PTRS subcarriers or avoided altogether by not using PTRS at all.

Figure 8A:
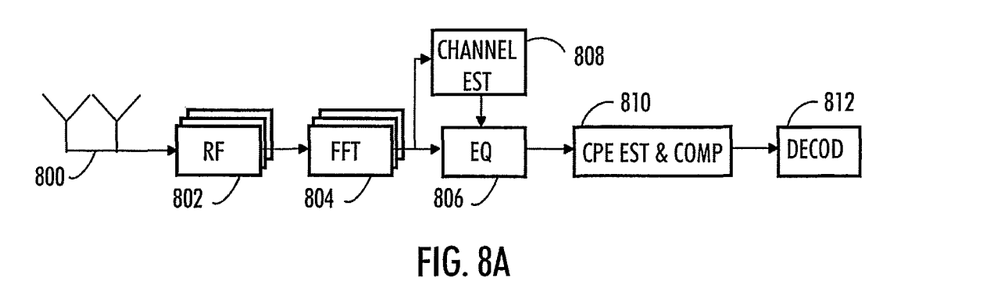
FIGS. 8A and 8B illustrate simplified examples of apparatuses applying embodiments of the invention.
Figure 8B:
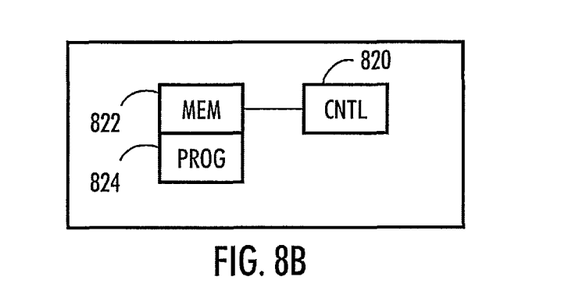

FIGS. 8A and 8B illustrate an embodiment. The figures illustrates a simplified example of an apparatus applying embodiments of the invention. In some embodiments, the apparatus may be an eNB or a part of an eNB. In some embodiments, the apparatus may be user terminal or a part of a user terminal.

It should be understood that the apparatus is depicted herein as an example illustrating some embodiments. It is apparent to a person skilled in the art that the apparatus may also comprise other functions and/or structures and not all described functions and structures are required. Although the apparatus has been depicted as one entity, different modules and memory may be implemented in one or more physical or logical entities.

The apparatus may comprise one or more antennas 800 or antenna groups with which a signal may be received. The received signal is taken to radio frequency parts 802 and to fast Fourier transforming (FFT) means 804. After FFT, the signal is taken to equaliser 806, which in part removes the effect of signal path to the signal on the basis of information from channel estimator 808. In an embodiment, the mentioned components may be realised using known methods.

The apparatus may further comprise phase error estimation and compensation processing unit which may be configured to perform some of the above mentioned method steps for estimating the phase rotating angle of received data symbols. The apparatus may further comprise a decoder 812 for decoding the signal.

At least some of the above mentioned components may be realised with a controller, controlling circuitry or processor 820. The components may comprise a memory 822 for storing data. Furthermore the memory may store software 824 executable by the circuitry 820. The memory may be integrated in the control circuitry.

In an embodiment, the software 824 may comprise a computer program comprising program code means adapted to cause the control circuitry 820 to receive as an input a frame comprising of a set of data symbols and reference symbols, each data symbol forming a rectangular symbol constellation of samples, derotate the first symbol of the set on the basis of the reference symbols, assume or set phase rotating angle of the first symbol as zero, for each following successive symbol in the set of symbols: perform equalization; reduce the number of samples in the constellation by selecting samples in two or more corners of the constellation by utilising two or more threshold values; estimate the phase rotating angle of the symbol from the reduced number of samples; and derotate the symbol on the basis of the determined phase rotating angle.

The steps and related functions described in the above and attached figures are in no absolute chronological order, and some of the steps may be performed simultaneously or in an order differing from the given one. Other functions can also be executed between the steps or within the steps. Some of the steps can also be left out or replaced with a corresponding step.

The apparatuses or controllers able to perform the above-described steps may be implemented as an electronic digital computer, which may comprise a working memory (RAM), a central processing unit (CPU), and a system clock. The CPU may comprise a set of registers, an arithmetic logic unit, and a controller. The controller is controlled by a sequence of program instructions transferred to the CPU from the RAM. The controller may contain a number of microinstructions for basic operations. The implementation of microinstructions may vary depending on the CPU design. The program instructions may be coded by a programming language, which may be a high-level programming language, such as C, Java, etc., or a low-level programming language, such as a machine language, or an assembler. The electronic digital computer may also have an operating system, which may provide system services to a computer program written with the program instructions.

As used in this application, the term 'circuitry' refers to all of the following: (a) hardware-only circuit implementations, such as implementations in only analog and/or digital circuitry, and (b) combinations of circuits and software (and/or firmware), such as (as applicable): (i) a combination of processor(s) or (ii) portions of processor(s)/software including digital signal processor(s), software, and memory(ies) that work together to cause an apparatus to perform various functions, and (c) circuits, such as a microprocessor(s) or a portion of a microprocessor(s), that require software or firmware for operation, even if the software or firmware is not physically present.

This definition of 'circuitry' applies to all uses of this term in this application. As a further example, as used in this application, the term 'circuitry' would also cover an implementation of merely a processor (or multiple processors) or a portion of a processor and its (or their) accompanying software and/or firmware. The term 'circuitry' would also cover, for example and if applicable to the particular element, a baseband integrated circuit or applications processor integrated circuit for a mobile phone or a similar integrated circuit in a server, a cellular network device, or another network device.

An embodiment provides a computer program embodied on a distribution medium, comprising program instructions which, when loaded into an electronic apparatus, are configured to control the apparatus to execute the embodiments described above.

The computer program may be in source code form, object code form, or in some intermediate form, and it may be stored in some sort of carrier, which may be any entity or device capable of carrying the program. Such carriers include a record medium, computer memory, read-only memory, and a software distribution package, for example.

Depending on the processing power needed, the computer program may be executed in a single electronic digital computer or it may be distributed amongst a number of computers.

The apparatus may also be implemented as one or more integrated circuits, such as application-specific integrated circuits ASIC. Other hardware embodiments are also feasible, such as a circuit built of separate logic components. A hybrid of these different implementations is also feasible. When selecting the method of implementation, a person skilled in the art will consider the requirements set for the size and power consumption of the apparatus, the necessary processing capacity, production costs, and production volumes, for example.

It will be obvious to a person skilled in the art that, as the technology advances, the inventive concept can be implemented in various ways. The invention and its embodiments are not limited to the examples described above but may vary within the scope of the claims.

The invention claimed is:

1. A method in a receiver of a communication system, comprising:
receiving as an input a data structure comprising of a set of data symbols and reference symbols, each data symbol forming a rectangular symbol constellation of samples;
derotating the first symbol of the set on the basis of the reference symbols;
assuming phase rotating angle of the first symbol as zero;
for each following successive data symbol in the set of symbols:
performing equalization;
reducing the number of samples in the constellation by selecting samples in two or more corners of the constellation by utilising two or more threshold values;
estimating the phase rotating angle of the symbol from the reduced number of samples;
derotating the symbol on the basis of the estimate phase rotating angle; and
using the derotated symbol to determine data.

2. The method of claim 1, wherein
after equalization, derotate a temporary copy of the symbol using the phase rotating angle of the previous symbol; and wherein
estimating the phase rotating angle of the symbol comprises estimating the phase rotating angle of the temporary copy of the symbol and determining the phase rotating angle of the symbol as a sum of the estimated phase rotating angle and the phase rotating angle of the previous symbol.

3. The method of claim 2, wherein
reducing the number of samples in the constellation comprises:
rotating symbol constellation a predetermined number of degrees;
selecting from the symbol constellation samples with smallest real part by applying a lower threshold and selecting samples that are smaller than the lower threshold; and
selecting from the symbol constellation samples with largest real part by applying a higher threshold and selecting samples that are greater than the higher threshold; and
estimating the phase rotating angle of the symbol comprises:

determining a line passing through the samples with the smallest and largest real parts; and
determining the slope of the line and calculating the phase rotating angle on the basis of the slope.

4. The method of claim 2, wherein
reducing the number of samples in the constellation comprises:
selecting from the symbol constellation samples with smallest imaginary part by applying a lower threshold and selecting samples that are smaller than the owe threshold;
selecting from the symbol constellation samples with largest imaginary part by applying a higher threshold and selecting samples that are greater than the higher threshold; and
rotating the constellation having the samples with the smallest and largest imaginary parts 90 degrees; and
estimating the phase rotating angle of the symbol comprises
determining a line passing through the samples with the smallest and largest imaginary parts; and
determining the slope of the line and calculating the phase rotating angle on the basis of the slope.

5. The method of claim 3, further comprising
determining a value for a first slope on the basis of the samples with the smallest and largest real parts and a value for a second slope on the basis of the samples with the smallest and largest imaginary parts;
taking an average of the first and second slope; and
calculating the phase rotating angle on the basis of the average.

6. The method of claim 3, wherein the lower and the higher threshold depend on the modulation method used in the transmission of the symbols.

7. The method of claim 2, wherein
estimating the phase rotating angle of a symbol comprises
selecting, utilising four thresholds, samples at each corner of the symbol constellation, thus obtaining four sample groups, the sample groups forming two sample group pairs where the sample groups of a sample group pair are on the opposite sides of the constellation;
determining a line passing through a sample group pair and determine slope k1 of the line;
determining a line passing through the other sample group pair and determine slope k2 of the line;
determining k3 as $\frac{1}{2}*(k1-1/k2)$;
determining the phase rotating angle as $atan(k3)-\pi/4$.

8. The method of claim 7, wherein the four thresholds are of the form $x=k_{th}*y+a_{th}$, where $k_{th}$ and $a_{th}$ are constants depending on the modulation method used in the transmission of the symbols.

9. The method of claim 1, wherein
reducing the number of samples in the constellation comprises:
selecting four thresholds of the form $x=k_{th}*y+a_{th}$, where $k_{th}$ and $a_{th}$ are constants depending on the modulation method used in the transmission of the symbols and the phase rotating angle of the previous symbol;
selecting, utilising the four thresholds, samples at each corner of the symbol constellation, thus obtaining four sample groups, the sample groups forming two sample group pairs where the sample groups of a sample group pair are on the opposite sides of the constellation; and estimating the phase rotating angle of a symbol comprises:
determining a line passing through a first sample group pair and determine slope k4 of the line;
determining a line passing through the other sample group pair and determine slope k5 of the line;
determining k6 as $\frac{1}{2}*(k4-1/k5)$;
determining the phase rotating angle as $atan(k6)-\pi/4$.

10. The method of claim 1, further comprising:
determining the number of samples after reducing the number of samples utilising two or more threshold values;
adjusting the two or more threshold values and reducing the number of samples in the constellation if the number of samples is smaller or greater than given limits.

11. An apparatus in a communication system, comprising:
at least one processor; and
at least one memory including computer program code,
the at least one memory and the computer program code configured, with the at least one processor, to cause the apparatus to perform at least the following:
receiving as an input a data structure comprising of a set of data symbols and reference symbols, each data symbol forming a rectangular symbol constellation of samples;
derotating the first symbol of the set on the basis of the reference symbols;
setting phase rotating angle of the first symbol as zero; and for each following successive symbol in the set of symbols:
performing equalization;
reducing the number of samples in the constellation by selecting samples in two or more corners of the constellation by utilising two or more threshold values;
estimating the phase rotating angle of the symbol from the reduced number of samples;
derotating the symbol on the basis of the estimated phase rotating angle; and
using the derotated symbol to determine data.

12. The apparatus of claim 11, wherein the at least one memory and the computer program code are configured, with the at least one processor, to cause the apparatus to perform at least the following:
derotating, after equalization, a temporary copy of the symbol using the phase rotating angle of the previous symbol; and
estimating the phase rotating angle of the symbol by estimating the phase rotating angle of the temporary copy of the symbol and determining the phase rotating angle of the symbol as a sum of the estimated phase rotating angle and the phase rotating angle of the previous symbol.

13. The apparatus of claim 12, wherein:
reducing the number of samples in the constellation comprises:
rotating symbol constellation a predetermined number of degrees;
selecting from the symbol constellation samples with smallest real part by applying a lower threshold and selecting samples that are smaller than the lower threshold; and
selecting from the symbol constellation samples with largest real part by applying a higher threshold and selecting samples that are greater than the higher threshold; and estimating the phase rotating angle of the symbol comprises:
   determining a line passing through the samples with the smallest and largest real parts; and
   determining the slope of the line and calculating the phase rotating angle on the basis of the slope.

14. The apparatus of claim 12, wherein:
reducing the number of samples in the constellation comprises:
   selecting from the symbol constellation samples with smallest imaginary part by applying a lower threshold and selecting samples that are smaller than the lower threshold;
   selecting from the symbol constellation samples with largest imaginary part by applying a higher threshold and selecting samples that are greater than the higher threshold; and
   rotating the constellation having the samples with the smallest and largest imaginary parts 90 degrees; and
estimating the phase rotating angle of the symbol comprises
   determining a line passing through the samples with the smallest and largest imaginary parts; and
   determining the slope of the line and calculating the phase rotating angle on the basis of the slope.

15. The apparatus of claim 13, wherein the at least one memory and the computer program code are configured, with the at least one processor, to cause the apparatus to perform at least the following:
   determining a value for a first slope on the basis of the samples with the smallest and largest real parts and a value for a second slope on the basis of the samples with the smallest and largest imaginary parts;
   taking an average of the first and second slope; and
   calculating the phase rotating angle on the basis of the average.

16. The apparatus of claim 13, wherein the lower and the higher threshold depend on the modulation method used in the transmission of the symbols.

17. The apparatus of claim 12, wherein:
estimating the phase rotating angle of a symbol comprises
   selecting, utilising four thresholds, samples at each corner of the symbol constellation, thus obtaining four sample groups, the sample groups forming two sample group pairs where the sample groups of a sample group pair are on the opposite sides of the constellation;
   determining a line passing through a sample group pair and determine slope k1 of the line;
   determining a line passing through the other sample group pair and determine slope k2 of the line;
   determining k3 as $\frac{1}{2}*(k1-1/k2)$; and
   determining the phase rotating angle as $\mathrm{atan}(k3)-\pi/4$.

18. The apparatus of claim 17, wherein the four thresholds are of the form $x=k_{th}*y+a_{th}$, where $k_{th}$ and $a_{th}$ are constants depending on the modulation method used in the transmission of the symbols.

19. The apparatus of claim 11, wherein:
reducing the number of samples in the constellation comprises:
   selecting four thresholds of the form $x=k_{th}*y+a_{th}$, where $k_{th}$ and $a_{th}$ are constants depending on the modulation method used in the transmission of the symbols and the phase rotating angle of the previous symbol;
   selecting, utilising the four thresholds, samples at each corner of the symbol constellation, thus obtaining four sample groups, the sample groups forming two sample group pairs where the sample groups of a sample group pair are on the opposite sides of the constellation;
estimating the phase rotating angle of a symbol comprises:
   determining a line passing through a first sample group pair and determine slope k4 of the line;
   determining a line passing through the other sample group pair and determining slope k5 of the line;
   determining k6 as $\frac{1}{2}*(k4-1/k5)$; and
   determining the phase rotating angle as $\mathrm{atan}(k6)-\pi/4$.

20. The apparatus of claim 11, wherein the at least one memory and the computer program code are configured, with the at least one processor, to cause the apparatus to perform at least the following:
   determining the number of samples after reducing the number of samples utilising two or more threshold values; and
   adjusting the two or more threshold values and reducing the number of samples in the constellation if the number of samples is smaller or greater than given limits.

21. A computer program product embodied on a non-transitory computer readable medium, comprising program instructions which, when loaded into an electronic apparatus, are configured to control the apparatus to execute steps comprising:
   receiving as an input a data structure comprising of a set of data symbols and reference symbols, each data symbol forming a rectangular symbol constellation of samples;
   derotating the first symbol of the set on the basis of the reference symbols;
   assuming phase rotating angle of the first symbol as zero;
   for each following successive data symbol in the set of symbols:
      performing equalization;
      reducing the number of samples in the constellation by selecting samples in two or more corners of the constellation by utilising two or more threshold values;
      estimating the phase rotating angle of the symbol from the reduced number of samples;
      derotating the symbol on the basis of the estimated phase rotating angle; and
      using the derotated symbol to determine data.

* * * * *

UNITED STATES PATENT AND TRADEMARK OFFICE
CERTIFICATE OF CORRECTION

PATENT NO. : 10,411,925 B2
APPLICATION NO. : 15/959349
DATED : September 10, 2019
INVENTOR(S) : Vihriala Page 1 of 1

It is certified that error appears in the above-identified patent and that said Letters Patent is hereby corrected as shown below:

In the Claims

Claim 1, Column 10, Line 40 "estimate" should be deleted and --estimated-- should be inserted.

Claim 4, Column 11, Line 11 "owe" should be deleted and --lower-- should be inserted.

Claim 10, Column 12, Line 12 --and-- should be inserted after "values;".

Signed and Sealed this
Fifteenth Day of October, 2019

Andrei Iancu
*Director of the United States Patent and Trademark Office*